Patented Jan. 7, 1936

2,027,323

UNITED STATES PATENT OFFICE 2,027,323

SULPHUR DYESTUFFS AND PROCESS OF MAKING SAME

Paul Schetelig, Basel, Switzerland, assignor to "Society of Chemical Industry in Basle", Basel, Switzerland No Drawing. Application August 7, 1934, Serial No. 738,865. In Switzerland August 19, 1933

9 Claims. (Cl. 260—17)

It has been found that new valuable sulphur dyestuffs are obtained by treating aromatic compounds containing at least 3 not linearly condensed isocyclic aromatic nuclei at higher temperatures with agents yielding sulphur. By the expression "aromatic compounds containing at least 3 not linearly condensed aromatic nuclei" there are to be understood in the first place those aromatic hydrocarbons which contain at least 3 not linearly condensed aromatic nuclei. Such hydrocarbons are for example

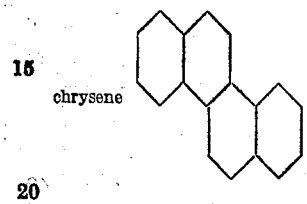 chrysene ; 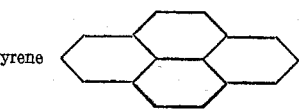 pyrene ; 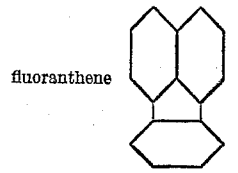 fluoranthene ;

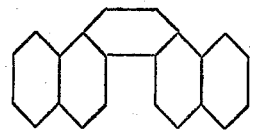 pycene ; 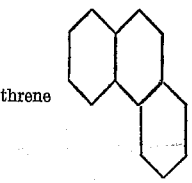 phenanthrene and the like. Further, there are to be understood the substitution products of these hydrocarbons, such as the sulpho-, hydroxy- and amino-derivatives thereof, e. g. aminochrysene, aminopyrene, acetylaminopyrene, hydroxypyrene, hydroxychrysene, hydroxyphenanthrene, pyrene-sulphonic acid, phenanthrene-sulphonic acid, aminophenanthrene, and the like.

As "agents yielding sulphur" there may be named above all sulphur itself, if desired in the presence of iodine as catalyst, or of auxiliaries, such as benzidine, toluylenediamine, etc., further sulphur chloride, sodium sulphide, polysulphides, and the like. The treatment with sulphur can also be carried out in several steps by heating the products of a first sulphurization alone at still higher temperatures. By the expression "higher temperatures" there are to be understood temperatures lying between 200 and 300° C. According to the nature of the compounds to be sulphurized the operation is carried out more in the neighbourhood of 200 to 250° C. or nearer to 300° C. as the case may be. The new dyestuffs obtainable according to the present process are characterized by containing very probably the carbon frame of the sulphurized hydrocarbons and hydrocarbon derivatives, respectively. They form dark powders which are insoluble in water, and partly soluble and partly insoluble in sulphuric acid. They dye cotton in an alkaline bath containing a reducing agent (sodium sulphide or sodium hydrosulphite) yellow to orange-brown or olive-brown and blackish tints which are distinguished by very good fastness properties, particularly good fastness to chlorine. This result is surprising for the reason because, as is known, the products of sulphurization of other higher hydrocarbons, such as the products of sulphurization of anthracene, yield dyestuffs which are not fast to chlorine.

The following examples illustrate the invention without, however, limiting the same, the parts being by weight:—

Example 1

60 parts of pyrene and 240 parts of sulphur are heated to 260–265° C. At this temperature the thinly liquid mass becomes thick while giving off hydrogen sulphide. When the mass can no longer be stirred, it is allowed to cool. The raw dyestuff thus obtained is finely pulverized. It is partly soluble in hot aqueous sodium sulphide.

The soluble portion is separated according to known methods. There is obtained a product in the form of a dark powder which is insoluble in water and dyes cotton from a sodium sulphide bath full brown tints. The new dyestuff dissolves in sulphuric acid to a brown solution.

The insoluble portion dyes vegetable fibers from the hydrosulphite vat a yellowish brown tint. Otherwise it possesses the same properties as the product soluble in sodium sulphide.

If the raw dyestuff is again baked for 24 hours at temperatures over 260° C., e. g. 270–280° C. or 280–290° C., dyestuffs are obtained which are hardly soluble in sodium sulphide but which, after removing the sulphur in excess, dye cotton from the hydrosulphite vat violet-brown to blackish-brown tints. The new dyestuff forms a dark powder, is insoluble in water, and dissolves in sulphuric acid to an olive-brown solution.

Example 2

60 parts of chrysene, 240 parts of sulphur and 0.1 part of iodine are heated at 270–280° C. until evolution of hydrogen sulphide ceases. The cold solidified melt is finely pulverized, treated with hot sodium sulphide solution, and the dyestuff isolated from the filtered solution according to known methods. It dyes cotton from a sodium sulphide bath brownish yellow tints which are fast to chlorine. Similar tints are obtained from the hydrosulphite vat. The new dyestuff forms a dark brown powder which is insoluble in water and sulphuric acid.

Example 3

60 parts of fluoranthene, 240 parts of sulphur and 0.1 part of iodine are melted together at 280–290° C. until evolution of hydrogen sulphide ceases. The cold melt is finely pulverized, treated with hot concentrated aqueous sodium sulphide solution, and the dyestuff isolated from the filtered solution in known manner. It dyes cotton both from a sodium sulphide bath and from the hydrosulphite vat brownish yellow tints of good fastness to chlorine. The new dyestuff forms a dark brown powder which is insoluble in water and sulphuric acid.

In these examples both the temperature and the proportions of weight of the starting materials may vary within wide limits.

Example 4

30 parts of phenanthrene and 90 parts of sulphur are heated to 320° C. until evolution of hydrogen sulphide ceases. The cold finely pulverized melt is purified by extraction with hot dilute sodium sulphide solution.

The dyestuff thus obtained dyes cotton from the hydrosulphite vat olive-black tints.

The quantitative proportions and the temperature may vary within wide limits. Catalysts such as iodine and heavy metal salts, may also be added to the sulphurization mass.

Example 5

180 parts of crystallized sodium sulphide are heated with 72 parts of sulphur until the sulphur has completely gone into solution. 20 parts of hydroxyphenanthrene, obtained by sulphonating phenanthrene and subsequently melting it with caustic alkalies, are then introduced into the mass, the whole is slowly evaporated in an open vessel, and the temperature finally raised to 250–260° C. The melt is introduced into water and the dyestuff isolated according to known methods. It dyes cotton from a sodium sulphide bath blackish-brown tints of good strength.

Example 6

30 parts of aminochrysene, 30 parts of benzidine and 150 parts of sulphur are heated to 240–250° C. until evolution of hydrogen sulphide ceases. The cold melt is coarsely ground and after-baked at 280–320° C. After working up according to known methods there are obtained dyestuffs which dye cotton from a sodium sulphide bath olive-brown tints.

When substituting aminopyrene for the aminochrysene there is obtained a dyestuff dyeing black-olive tints. By replacing the above amino derivatives by the corresponding N-acetyl compounds there are obtained dyestuffs dyeing blackish-blue or blackish-olive tints. The substitution of the formyl-group for the acetyl-group leads to dyestuffs dyeing yellow-olive tints.

The quantitative proportions of the various components may vary within wide limits.

What I claim is:—

1. Process for the manufacture of sulphur dyestuffs, consisting in treating aromatic compounds containing the radical of such an aromatic hydrocarbon which contains itself at least 3 not linearly condensed aromatic isocyclic nuclei at temperatures lying between 200 and 300° C. with agents yielding sulphur.

2. Process for the manufacture of sulphur dyestuffs, consisting in treating aromatic hydrocarbons containing at least 3 not linearly condensed aromatic nuclei at temperatures lying between 200 and 300° C. with agents yielding sulphur.

3. Process for the manufacture of a sulphur dyestuff, consisting in treating chrysene at temperatures lying between 200 and 300° C. with sulphur.

4. Process for the manufacture of a sulphur dyestuff, consisting in treating fluoranthene at temperatures lying between 200 and 300° C. with sulphur.

5. Process for the manufacture of a sulphur dyestuff, consisting in treating pyrene at temperatures lying between 200 and 300° C. with sulphur.

6. The sulphur dyestuffs containing the carbon frame of such hydrocarbons which contain at least 3 not linearly condensed aromatic isocyclic nuclei, which products represent dark colored powders insoluble in water and dyeing cotton from an alkaline bath containing a reducing agent yellow to brown tints.

7. The product of sulphurization of chrysene which is a dark powder insoluble in water and dyeing cotton from an alkaline bath containing a reducing agent brownish-yellow tints fast to chlorine.

8. The product of sulphurization of fluoranthene which is a dark powder insoluble in water and dyeing cotton from an alkaline bath containing a reducing agent brownish-yellow tints fast to chlorine.

9. The product of sulphurization of pyrene which is a dark blackish powder insoluble in water but soluble in sulphuric acid to an olive-brown solution, and dyeing cotton from the hydrosulphite vat blackish-brown tints.

PAUL SCHETELIG.